United States Patent [19]

Tarver, Jr.

[11] 4,117,653

[45] Oct. 3, 1978

[54] SPREADING DEVICE FOR DRUM MOWERS

[76] Inventor: Samuel Allen Tarver, Jr., Hwy. 25 N, Folsom, La. 70437

[21] Appl. No.: 718,005

[22] Filed: Aug. 26, 1976

[51] Int. Cl.² ........................................... A01D 35/264
[52] U.S. Cl. ...................................... 56/13.6; 56/192
[58] Field of Search .................... 56/13.6, 192, 6, 503, 56/370, 257, 14.5, 295, 314

[56] References Cited

U.S. PATENT DOCUMENTS

| | | | |
|---|---|---|---|
| 2,714,795 | 8/1955 | Clendening | 56/314 |
| 3,221,484 | 12/1965 | van der Lely | 56/192 |
| 3,469,378 | 9/1969 | Heesters et al. | 56/13.6 |
| 3,501,901 | 3/1970 | van der Lely | 56/13.6 |
| 3,577,870 | 5/1971 | van der Lely | 56/6 |
| 3,844,094 | 10/1974 | Janzen | 56/314 |

FOREIGN PATENT DOCUMENTS

| | | | |
|---|---|---|---|
| 264,891 | 9/1968 | Australia | 56/192 |
| 1,925,708 | 11/1969 | Fed. Rep. of Germany | 56/192 |

*Primary Examiner*—Jay N. Eskovitz
*Attorney, Agent, or Firm*—Oblon, Fisher, Spivak, McClelland & Maier

[57] ABSTRACT

A spreading device is disclosed which is particularly suitable for use with drum mowers. The spreading device includes a crop divider of a unique shape and configuration which extends in front of the forward mowing direction of the mower and which is positioned between the two mower drums, or between each pair of mower drums in a large scale mower. The crop divider includes two fins extending in an angled relationship with respect to a main body portion thereof forming a Y-shaped configuration when viewed from the top. A pair of feeder chains is connected to each of the drum mowers in the pair for moving the cut crop through the mower and adjacent to the crop divider fins.

6 Claims, 4 Drawing Figures

SPREADING DEVICE FOR DRUM MOWERS

BACKGROUND OF THE INVENTION

1. Field of the Invention

The present invention relates generally to attachments for mowing machines, and particularly to a crop spreading device for use with drum mowers.

2. Description of the Prior Art

A wide variety of different types of crop mowing machines are familiar to those skilled in the art. One type of mower is the well known reciprocating mower, an example of which is disclosed in U.S. Pat. No. 2,714,795 to Clendening. This type of mower suffers from the disadvantage of having a somewhat slow mowing speed and also from the fact that it is susceptible to severe damage from rigid or hard objects scattered within a crop being mowed. Furthermore, reciprocating mowers tend to jam or become clogged by certain types of crops or by crops which have been blown over other otherwise flatened. However, this type of mower possesses an advantage in that it drops the cut crop in a uniform pattern across the entire width of the mower, thus enabling the crop to dry with relative ease.

Another well known type of mower is the rotating drum mower of the type disclosed in U.S. Pat. No. 3,391,522 to Zweegers. This type of mower is considered by many to be a substantial improvement over the reciprocating mower in that it permits high mowing speeds and can cut smoothly through virtually any type of crop, even those that are crushed or flatened by rain or wind. Furthermore, the rotating mowers generally do not sustain significant damage even when coming into contact with solid objects scattered among growing crops.

Drum mowers, however, possess one feature which is considered to be a disadvantage by many farmers. This is the fact that the cut crop is concentrated into a pile or row at the center of the mower. In other words, the crop cut across the entire swath of the mower is stacked in an area that is generally only ⅓ or less the width of the mowed swath. The cut crop is accordingly piled significantly deeper in limited areas by the drum mower than by the reciprocating type of mower.

Although in the past it has been considered an advantage to have the crop concentrated in pile rows of the type produced by rotary mowers, many farmers and agricultural experts presently believe that uniform distribution of the mowed crop over the entire mowed swath provide a significant advantage in reducing the time required for drying of the mowed crop. This feature is especially important in the mowing of hay where the hay must be dried to be effectively bailed or otherwise processed.

According a need exists for an apparatus which will permit a combination of the mowing speed and reliability of drum mowers with the crop spreading capability of reciprocating mowers. A need further exists for the achievement of this goal with the maximum of manufacturing economy and in such a manner that conventional drum mowing machines can be easily adapted to perform the crop spreading function.

SUMMARY OF THE INVENTION

Accordingly, one object of this invention is the provision of a novel crop spreading device for drum or rotary mowers.

A further object of the present invention is the provision of a novel crop divider and feeder chain arrangement which is particularly suitable for mounting to drum mowers.

Yet another object of the present invention is the provision of a novel addition to conventional drum mowers for permitting these mowers to distribute the mowed crop evenly over the mowed swath.

Yet another object of the present invention is the provision of an inexpensive and easily produced modification for drum mowers to permit such mowers to evenly spread a mowed crop.

Yet another object of the present invention is the provision of a structurally simple modification which is easily attachable to conventional rotary mowing machines for enabling such machines to spread mowed crops evenly over the mowed swath.

Briefly, these and other objects of the invention are achieved in accordance with the present invention by the provision of a uniquely formed and shaped crop divider positioned between the two drums of a drum type mower. The crop divider includes a body portion extending in front of the rotary mowers and tipped with a structure for preventing crop bunching. The rear of the crop divider includes two curved fins arranged with the main body of the crop divider in a Y-shaped configuration when viewed from the top. A pair of feeder chains are coupled to the rotating mower drums and cooperate with the crop divider to provide the crop spreading function. The chains are appropriately dimensioned and positioned in proper relationship with the cutter blades and the crop divider fins to provide uniform distribution of the mowed crop.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
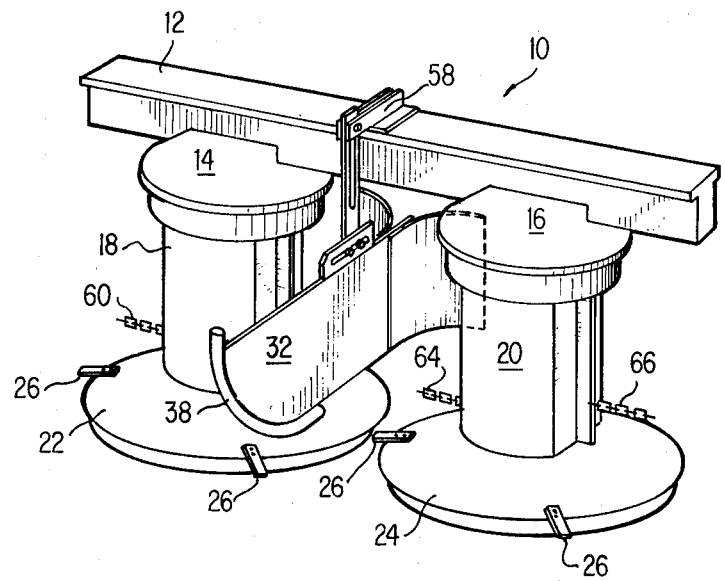
FIG. 1 is a perspective illustration of the present invention coupled to a conventional rotary crop mowing machine.

Referring now to the drawings, wherein like reference numerals designate identical or corresponding parts throughout the several views, and more particularly to FIG. 1 thereof, a conventional rotary crop mower is shown and is designated generally by the reference numeral 10. Rotary mowers of this type are well known by those skilled in the art and have attained significant commerical success in view of their high speed, efficiency and both rugged and reliable operation. Devices of this type are manufactured, for example, by P. J. Zweegers & Zonen of Geldrop, Holland.

The particular mower illustrated in the drawings is a two blade apparatus which is identified as a Zweegers Model CM 165 CYCLOMOWER (TM), although the present invention is applicable to virtually any type of rotary crop mower having the general configuration illustrated. Furthermore, although the illustrated unit includes only two mower drums, the invention is also useful with mowers having more than two drums, such as that illustrated in U.S. Pat. No. 3,391,522, referenced above.

Referring again to FIG. 1, the mower 10 includes a box-shaped frame beam 12 which serves as a housing for the mower driving mechanism (not shown). A pair of conical caps 14 and 16 are welded to the frame beam 12 to provide the upper end enclosure for a pair of rotary mowing drums 18 and 20. Conical shaped collars 22 and 24 are respectively secured to the lower extremities of the mowing drums 18 and 20 for carrying and driving cutter knives or blades 26. Saucer shaped supports 28 and 30 are positioned beneath the collars 22 and 24, respectively, to support the mower as it travels over the surface of the ground. It is noted that the features and structure of the mower assembly described above provide no part of the present invention and further details thereof may be found by reference to U.S. Pat. No. 3,391,522, previously mentioned.

Figure 2:
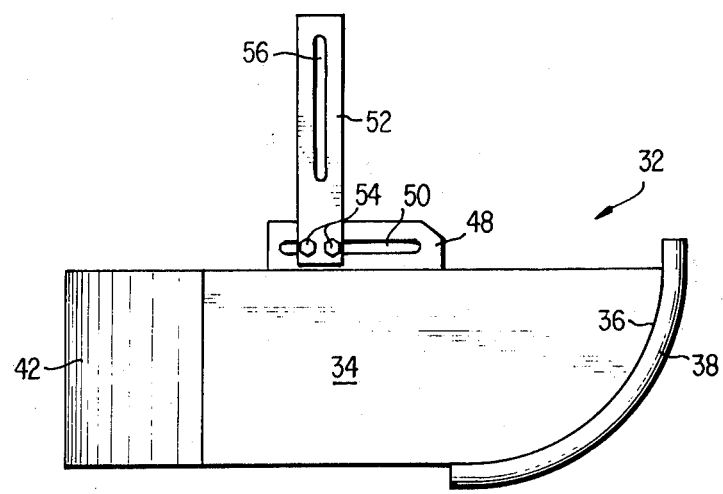
FIG. 2 is a side view of the crop divider illustrating the structural details and configuration thereof.

Between the two mower drums 18 and 20 is secured a crop divider 32, the structure of which is shown in greater detail in FIG. 2. Referring now to FIG. 2, the crop divider is shown as including a main body portion 34, preferably formed of conventional quarter inch steel plate and having an upwardly curved front surface 36 providing the crop divider with a "boat-shaped" profile. A length of tubing 38, which may, for example, be conventional steel tubing having a outer diameter of 1 and 5/16 inches, is welded to the front of the main body portion 34 and is shaped to conform to the curve of the front surface 36. The tubing 38 provides the crop divider 32 with a rounded and gently downwardly sloping frontal surface which is particularly effective in separating and forming a path in advance of the mower through crops to be mowed. The rounded nature of the tubing and gentle downward curvature of the front surface of the crop divider prevent bunching or tangling of the crops in front of the divider and enables the divider to move through the crops in a smooth manner.

Figure 4:
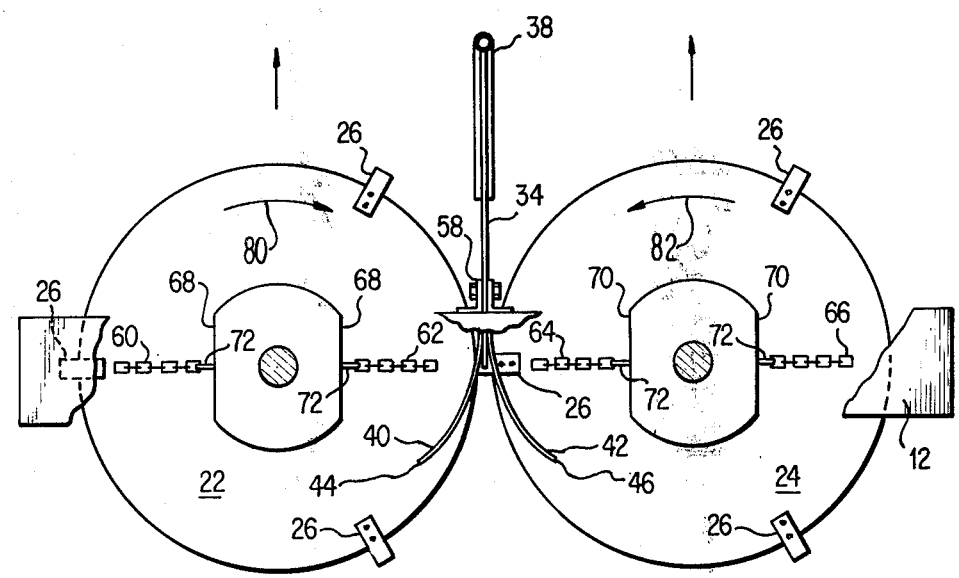
FIG. 4 is a top view of the apparatus illustrated in FIG. 3 showing in a different manner the relationship of the crop spreading components of the present invention with respect to the conventional rotary crop mowing apparatus.

A pair of curved crop channelling fins or vanes 40 and 42 are welded or otherwise fastened to the rear of the main body portion 34 of the crop divider. The fins 40 and 42 have a linear length which is approximately ⅓ the length of the main body portion 34 of the crop divider and are each outwardly curved in opposite directions from the plane defined by the main body portion 34. The curvature of the fins 40 and 42 is best shown in FIG. 4 wherein the crop divider is viewed from the top. The radius of curvature of the fins 40 and 42 is such that the fins curve gently away from the plane of the body portion 34 and such that their respective end surfaces 44 and 46 fall between 1 and 3 inches within the circumference of the conical collars 22 and 24, respectively. It has been experimentally determined that the fins should preferably fall within 1½ to 2 inches within the radius of the conical collars 22 and 24, for optimum results, although certain variations outside this limited range are considered acceptable within the scope of the present invention.

The crop divider is secured to the frame beam 12 by means of a mounting bracket 48 which is welded or otherwise secured to the top of the main body portion 34 of the crop divider, and which defines an elongated slot 50 for permitting several inches of forward and backward positioning of the crop divider. A vertical support member 52 is secured to the mounting bracket 48 by means of bolts 54 or other suitable fastening members. The vertical support member includes a vertically oriented elongated slot 56 to permit vertical positioning of the crop divider. The vertical support member 52 is bolted or otherwise secured to an L-bracket 58 which is welded or bolted to the top surface of the mower frame beam 12. It will be appreciated by those skilled in the art that the adjustment features of the crop divider may be eliminated, and that the support structures can be welded in place to achieve additional rigity at the expense of flexibility. Slight adjustments in the position of the crop divider both vertically and horizontally are useful, but not necessary, in adjusting the crop divider for optimum performance with different types of crops.

Figure 3:
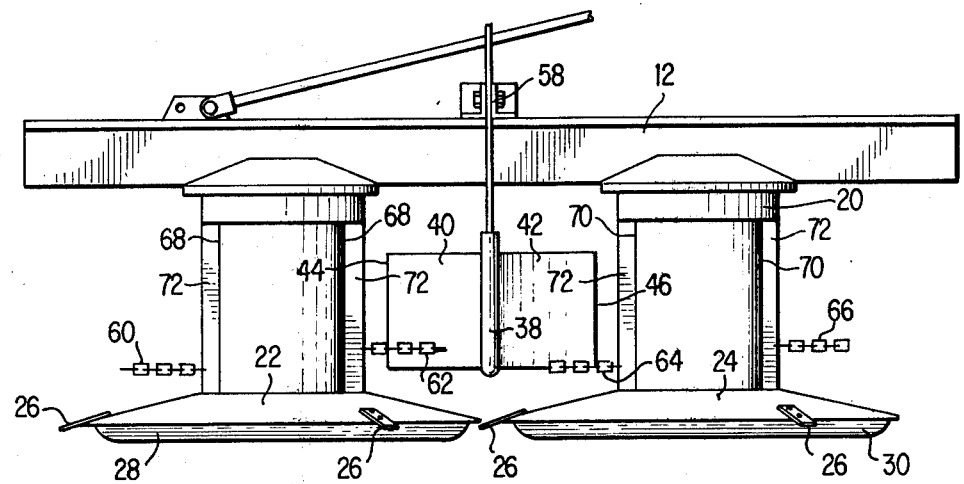
FIG. 3 is a rear view of the spreading apparatus of the present invention coupled to a conventional rotary crop mowing machine of the type illustrated in FIG. 1.

Another important feature of the present invention which is necessary in conjunction with the crop divider to provide the desired crop spreading effect is the use of feeder chains 60, 62, 64 and 66, illustrated clearly in FIGS. 3 and 4. As shown in these FIGURES, the drums 18 and 20 of the previously described conventional mowing machine each have a pair of flat side surfaces 68 and 70 respectively. At the center of this flat side surface, extending nearly from the top to the bottom thereof is a short vertical protrusion 76 which has a width such that it extends out to the diameter that the drums 18 and 20 would have if they were completely round. The chains 60–66 are conveniently coupled to these protrusions. It is noted that the protrusions 72 are not required in accordance with the present invention, since the chains can be otherwise coupled to the rotating drums. However, the protrusions provide an extremely convenient point of attachment. It is further noted that the drums need not be round with matching flat side portions to accommodate the feeder chains of the present invention. The drums can also be other regular shapes, such as the regular decagon shape disclosed in the above mentioned patent to Zweegers.

The feeder chains are preferably formed of lengths of conventional steel chain, and in the illustrated embodiment preferably have a length of approximately 5 and ½ inches. The length of the feeder chains is selected so that the ends of the feeder chains, when fully extended, fall a few inches within the perimeters of the conical collars 22 and 24. Further, the outermost extension of the feeder chains should pass within 2 inches of the end surfaces 46 of the crop channelling fins to provide the proper crop spreading characteristics. The feeder chains are radially oriented so that one of the feeder chains on each of the drums, such as the chains 60 and 64, are aligned exactly parallel with one of the cutter blades 26. The other feeder chain on each drum (62 and 66) are thus arranged 180° out of phase with the other feeder chain and ½ the angular distance between the remaining two cutter blades 26.

Referring to FIG. 3, the two feeder chains on each drum are set at different heights in accordance with the teachings of the present invention to provide a thorough and complete crop spreading action. Specifically, the two chains 60 and 64, which are aligned with the cutter blades 26, are positioned relatively lower than the chains 62 and 66 mounted on the opposite sides of the two cutter drums 18 and 20. The lower mounted chains 60 and 64 are mounted at a height so that, when fully extended, their central axis is parallel to the lower edge of the crop channelling fins 40 and 42. The upper chains 62 and 66 are mounted at a height such that they pass one or more inches above the lower edge of the crop channelling fins. This staggered height arrangement of the chains is significant in causing an even distribution of the mowed crop because the lower mounted chains 60 and 64 tend to cause a portion of the mowed crop to bypass the crop channelling fins and thus to drop behind the mower in the region between the two mower drums 18 and 20. On the other hand, the higher chains 62 and 66 tend to propel a portion of the mowed crop into engagement with the crop channelling fins 40 and 42 which have the effect of both angling the mowed crop out toward the outer edges of the mower and also of maintaining the mowed crop in contact with the feeder chains for a longer interval whereby a larger angular velocity is imparted to this portion of the mowed crop to cause it to be propelled further out toward the extremeties of the mower. These combined effects aid in producing a uniform distribution of the mowed crop.

The resulting assembly described above provides an amazingly reliable and effective spreader device for conventional rotary crop mowing machines. Furthermore, it is extremely rigid, reliable and simple to construct, and thereby carries the attributes of minimal manufacturing expense together with high standards of reliability, long term performance and easy serviceability. Furthermore, the system is completely self cleaning and does not destroy or severely mutilate mowed crops as they are being spread out behind the mowing machine.

In operation, the crop divider is first adjusted with respect to the distance of its leading edge relative to the front of the mower and its height is also adjusted in accordance with ground and crop conditions. When the mowing operation begins, the crop divider precedes the cutters through the crop to be mowed and gently divides the crop without bunching or clogging so that one half of the swath to be mowed is appropriately fed into one of the rotating mowers. As the crop is cut by the mower blades, it falls upon the conical collars 22 and 24 and is thus carried inwardly toward the crop divider by the rotation of the mowing drums and collars. The mowed crop is also engaged by the feeder chains which rotate so that they sweep the mowed crop in toward the crop divider 32, as indicated by the arrows 80 and 82, respectively, and impart an additional positive driving force to the crop after it has been cut. It is noted that the feeder chains do not extend to the periphery of the collars 22 and 24, and thus do not engage the crop before it is cut by the blades 26, even if the crop is leaning in toward the mower drums due to having been flattened by wind or rain conditions. Thus the crop is cleanly cut without mutilation by the knives or blades 26 even in the presence of the feeder chains according to the present invention. The velocity imparted to the portion of the crop engaged by the lower feeder chains 60 and 64 generally tends to propel this portion of the crop more directly toward the rear of the mower than toward the side portions thereof. On the other hand, the upper feeding chains combined with the angular crop channelling fins 40 and 42 tend to spread the crop out toward the lateral extremities of the mowing machine. The air current created by the movement of the mowing machine and by the swirling mowers also aids in moving the mown crop through the apparatus of the present invention and in distributing the crop in a uniform fashion behind the mowing machine. The combined action of the rotating mower collars 22 and 24, the feeder chains and the air currents together with the shape of the crop divider result in a non-jamming, self cleaning assembly which does not accumulate crop components, regardless of the condition or type of crop to be mowed. Accordingly, the apparatus of the present invention has been found to function in a completely uniform and trouble free manner in all types of differing circumstances.

The present invention is suitable for use with all types of drum or vertical cylindrical type mowing machines of the types manufactured by P. J. Zweegers a Zonen, Fahr, Krone, Bamford, J & F, as well as those of other manufacturers. Although the preferred embodiment of the invention described herein is shown in conjunction with a two drum mower, it will be apparent from the preceeding disclosure that the apparatus of the present invention can clearly be used with mowers of more than two drums, and it will further be apparent to those skilled in the art that the specific dimensions referred to herein can be changed proportionally to accommodate the present invention to mowers of differing sizes.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a rotary mowing machine including a frame member and at least a pair of rotary mower drums rotatably mounted to said frame member, a spreading device for evenly distributing a mowed crop over a mowed swath comprising:
    a crop divider for dividing crops to be mowed, said crop divider secured to said frame member at a position between said mower drums and extending forward of said drums in the direction of mowing, said crop divider including an upstanding main body portion having rewardly extending crop channelling fins;
    said mower drums rotating toward said crop divider in said direction of mowing; and,
    feeder chain means coupled to each of said mower drums for sweeping said mowed crop toward said crop divider and cooperating with said crop channelling fins for distributing the mowed crop uniformly across the mowed swath.

2. A rotary mowing machine as in claim 1, wherein:
    said crop divider includes a curved, sloping front edge with a rounded element secured thereto to prevent crop bunching.

3. In a rotary mowing machine including a frame member and at least a pair of rotary mower drums rotatably mounted to said frame member, a spreading device for evenly distributing a mowed crop over a mowed swath comprising:
    a crop divider secured to said frame member at a position between said mower drums and extending forward of said drums in the direction of mowing, said crop divider including a main body portion having a pair of crop channelling fins at the rear of and extending outwardly from the plane of said main body portion, and chain means for sweeping said mowed crop toward said crop divider, said feeder chain means including at least two pairs of feeder chains, each pair of feeder chains coupled to a respective rotary mowing drum, one of the feeder chains in each pair coupled to the respective rotary mower drum at a height substantially the same as that of the bottom edge of said crop channelling fins, and the other of the feeder chains in each pair coupled to the respective rotary mower drum at a position above that of said one of the feeder chains for cooperating with said channelling fins and distributing the mowed crop uniformly across the mowed swath.

4. The rotary mowing machine recited in claim 3 wherein said feeder chains have a uniform length such that said chains closely approach and cooperate with said crop channelling fins for distributing said mowed crop and do not engage unmowed portions of said crop.

5. The rotary mowing machine recited in claim 3 wherein said crop channelling fins have an arcuate shape.

6. The rotary mowing machine recited in claim 3 wherein said crop divider includes means for permitting vertical and horizontal adjustment thereof.

* * * * *